United States Patent
Shi

(10) Patent No.: US 10,170,089 B2
(45) Date of Patent: Jan. 1, 2019

(54) METHOD AND APPARATUS FOR LIGHTING CONTROL OF A DIGITAL KEYBOARD MUSICAL INSTRUMENT

(71) Applicant: Zheng Shi, Beijing (CN)

(72) Inventor: Zheng Shi, Beijing (CN)

(*) Notice: Subject to any disclaimer, the term of this patent is extended or adjusted under 35 U.S.C. 154(b) by 0 days.

(21) Appl. No.: 15/119,390

(22) PCT Filed: Jan. 14, 2016

(86) PCT No.: PCT/CN2016/070909
§ 371 (c)(1),
(2) Date: Aug. 17, 2016

(87) PCT Pub. No.: WO2016/165431
PCT Pub. Date: Oct. 20, 2016

(65) Prior Publication Data
US 2018/0174560 A1      Jun. 21, 2018

(30) Foreign Application Priority Data

Apr. 13, 2015   (CN) .......................... 2015 1 0172897

(51) Int. Cl.
*A63H 5/00* (2006.01)
*G10H 1/00* (2006.01)
(Continued)

(52) U.S. Cl.
CPC .......... *G10H 1/0016* (2013.01); *G10H 1/0551* (2013.01); *G10H 1/344* (2013.01);
(Continued)

(58) Field of Classification Search
CPC ................ G10H 1/0016; G10H 1/344; G10H 2220/096; G10H 2220/265;
(Continued)

(56) References Cited

U.S. PATENT DOCUMENTS 5,286,909 A * 2/1994 Shibukawa .......... G10H 1/0016
                                                    84/478
6,410,836 B2 * 6/2002 Takahashi ............ G09B 15/023
                                                    84/478

(Continued)

*Primary Examiner* — Jeffrey Donels

(57) ABSTRACT

The present invention provides a method and apparatus for controlling a light-emitting device of a digital keyboard musical instrument. The method includes: detecting a touch action generated by a user upon a key of the digital keyboard musical instrument and generating a touch signal, by a sensor placed underneath the key, and transmitting the touch signal to a processor, wherein the touch signal comprises the magnitude information of the touch action; receiving the touch signal and generating a corresponding control signal in accordance with the magnitude information of the touch signal, by the processor; and actuating the light-emitting device to produce a light-emitting effect in accordance with the control signal by the processor. Since the detection of the touch action upon the key by the sensors is accurate enough to capture all details of the complete key-touching action, the light-emitting effect produced based on this more detailed detection of the touch action is more exquisite and accurate.

12 Claims, 3 Drawing Sheets

(51) Int. Cl.
*G10H 1/055* (2006.01)
*G10H 1/34* (2006.01)
*H05B 33/08* (2006.01)
*H05B 37/02* (2006.01)

(52) U.S. Cl.
CPC ..... *H05B 33/0854* (2013.01); *H05B 33/0872* (2013.01); *H05B 37/0227* (2013.01); *H05B 37/0236* (2013.01); *G10H 2210/211* (2013.01); *G10H 2210/225* (2013.01); *G10H 2220/096* (2013.01); *G10H 2220/241* (2013.01); *G10H 2220/265* (2013.01)

(58) Field of Classification Search
CPC ............ H05B 33/0854; H05B 33/0872; H05B 37/0227; H05B 37/0236
USPC .......................................................... 84/609
See application file for complete search history.

(56) References Cited

U.S. PATENT DOCUMENTS

| | | | | |
|---|---|---|---|---|
| 6,515,210 | B2* | 2/2003 | Shibukawa | G09B 15/026 84/477 R |
| 7,169,995 | B2* | 1/2007 | Lin | A63J 17/00 84/464 R |
| 7,674,964 | B2* | 3/2010 | Ohmura | G10H 1/0008 84/464 A |
| 8,525,011 | B2* | 9/2013 | Ihara | G09B 15/08 84/464 R |
| 8,901,405 | B1* | 12/2014 | McCarthy | G09B 15/003 84/423 R |
| 2005/0204899 | A1* | 9/2005 | Cheng | G06F 3/0238 84/464 A |
| 2013/0082951 | A1* | 4/2013 | Tanaka | G06F 3/041 345/173 |
| 2014/0260898 | A1* | 9/2014 | Bales | G09B 15/026 84/433 |

* cited by examiner

US 10,170,089 B2

METHOD AND APPARATUS FOR LIGHTING CONTROL OF A DIGITAL KEYBOARD MUSICAL INSTRUMENT

TECHNICAL FIELD

The present invention relates to the field of lighting control. More particularly, the present invention relates to a method and accompanying apparatus for controlling a light-emitting device of a digital keyboard musical instrument.

BACKGROUND

Commonly used digital keyboard musical instruments, such as piano, accordion, electronic organ and organ, in the hands of a musician, can create great music that makes people relax in the busy work and life.

Just for fun, a certain light-emitting effect can be added to the music with the development of technology, namely music lighting technology.

The existing music lighting technology usually collects a sound signal of music, then converts the sound signal into a control signal that a light-emitting system or a light-emitting module can recognize, eventually achieves real-time change of light-emitting effect subject to the music.

For digital keyboard musical instruments, during the process of converting the sound signal into the control signal for light-emitting, as described above, the eventual light-emitting effect is only associated with a fixed pitch of a key, which is a rough control that can't achieve a more subtle control of the light-emitting effect by the course of action of the key.

SUMMARY OF THE INVENTION

To address the issue above, the present invention provides a method and accompanying apparatus for controlling a light-emitting device of a digital keyboard musical instrument, to achieve subtle control of light-emitting effect by the course of action of the key, namely musical gesture.

The present invention provides a method for controlling a light-emitting device of a digital keyboard musical instrument, comprising:
  detecting a touch action generated by a user upon a key of the digital keyboard musical instrument and generating a touch signal, by a sensor placed underneath the key, and transmitting the touch signal to a processor, wherein the touch signal comprises the magnitude information of the touch action;
  receiving the touch signal and generating a corresponding control signal in accordance with the magnitude information of the touch signal, by the processor;
  actuating the light-emitting device to produce a light-emitting effect in accordance with the control signal, by the processor.

The present invention also provides an apparatus for controlling a light-emitting device of a digital keyboard musical instrument, comprising:
  a sensor, a processor and a light-emitting device;
  the sensor corresponds to a key of the digital keyboard musical instrument and is placed underneath the corresponding key;
  the sensor is configured to detect a touch action generated by a user upon the key of the digital keyboard musical instrument and generate a touch signal, and transmit the touch signal to the processor, wherein the touch signal comprises the magnitude information of the touch action;
  the processor is configured to receive the touch signal and generate a corresponding control signal in accordance with the magnitude information of the touch signal;
  and the processor is configured to actuate the light-emitting device to produce a light-emitting effect in accordance with the control signal.

As per the method and apparatus for controlling the light-emitting device of the digital keyboard musical instrument disclosed in the present invention, the sensor placed underneath each key of the digital keyboard musical instrument is configured to detect the touch action upon the key and generate the analogue touch signal corresponding to the touch action, which enables the processor to actuate the light-emitting device to produce the light-emitting effect in accordance with the magnitude information of the touch signal. Because the detection of the touch action upon the key is accurate enough to capture all details of the complete key-touching action, the light-emitting effect produced based on this more detailed detection of the touch action, i.e., the corresponding control signal in accordance with the magnitude information of the touch action, will be more exquisite, making the light-emitting control more accurate.

BRIEF DESCRIPTION OF THE DRAWINGS

To better illustrate the technical features of the embodiments of the present invention, various embodiments of the present invention will be briefly described in conjunction with the accompanying drawings. It should be obvious that the drawings are only for exemplary embodiments of the present invention, and that a person of ordinary skill in the art may derive additional drawings without deviating from the principles of the present invention.

DETAILED DESCRIPTION OF THE INVENTION

To better illustrate the purpose, technical feature, and advantages of the embodiments of the present invention, various embodiments of the present invention will be further described in conjunction with the accompanying drawings.

While the present invention will be described in connection with various specific embodiments, the invention is not limited to these embodiments. People skilled in the art will recognize that the method and apparatus of the present invention may be used in many other applications. The present invention is intended to cover all alternatives, modifications and equivalents within the spirit and scope of invention, which is defined by the apprehended claims.

Figure 1:
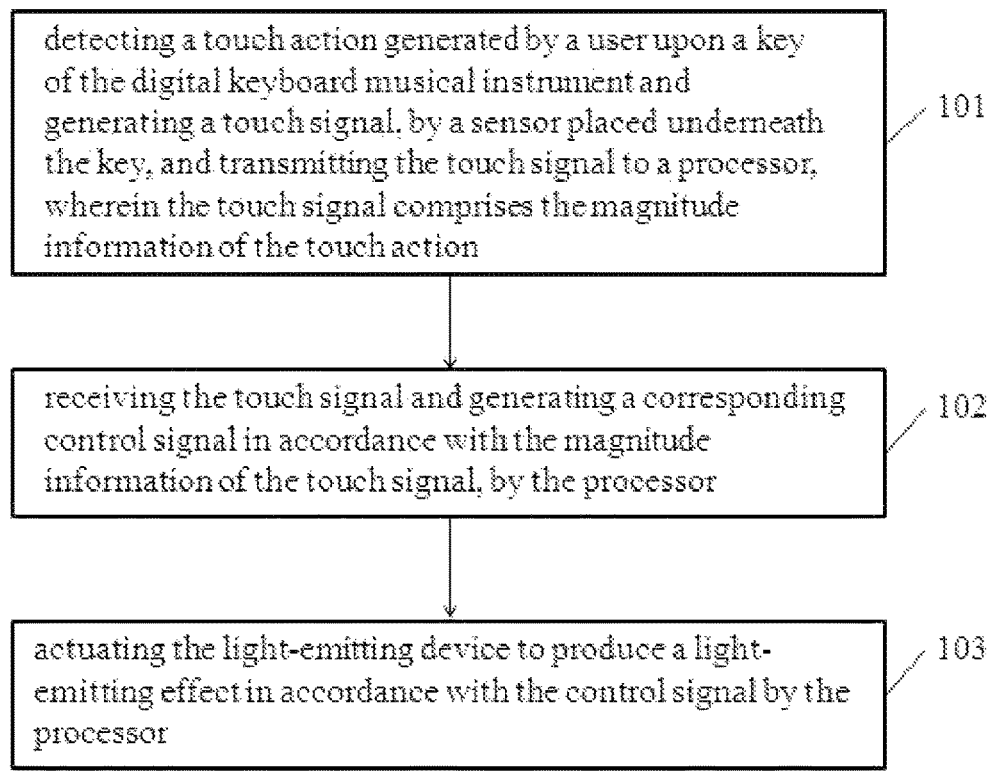
FIG. 1 is an exemplary schematic diagram illustrating the method for controlling a light-emitting device of a digital keyboard musical instrument in accordance with one embodiment of the present invention.

FIG. 1 is an exemplary schematic diagram illustrating the method for controlling a light-emitting device of a digital keyboard musical instrument in accordance with one embodiment of the present invention. The method can be executed by an apparatus for controlling a light-emitting device of a digital keyboard musical instrument, which includes a sensor, a processor and a light-emitting device. As shown in FIG. 1, the method includes:

Step 101. Detecting a touch action generated by a user upon a key of the digital keyboard musical instrument and generating a touch signal, by the sensor placed underneath the key, and transmit the touch signal to the processor. The touch signal includes the magnitude information of the touch action.

In this embodiment, in order to detect the touch action by users, the apparatus for controlling a light-emitting device is equipped with sensors that correspond to each key of the digital keyboard musical instrument and complete detection of the touch action. Specifically, each key corresponds to one sensor placed underneath the key, and the sensor could be either a capacitance sensor or a pressure sensor.

For a capacitance sensor, it usually takes approximately 20 milliseconds to sense the capacitance change and produce the analogue output, and thus the analogue output of the capacitance change can be considered continuous. For the digital keyboard musical instrument, on the other hand, it takes approximately 150 milliseconds to complete a touch action at the maximum speed. Therefore, it is technically possible and feasible for capturing the touch action by continuous analogue signals generated by capacitance sensors.

Though capacitance sensor is used as an example in this embodiment, the concept is also applicable to pressure sensor. It is a dynamic process for a user to be in contact with a key, act upon the key and leave the key. One simple case is to touch the key, depress the key and then release the key. During this process, the action performed upon a key by a user results in the capacitance change of the capacitance sensors, and a corresponding touch signal is generated in accordance with the capacitance change. Thus, the capacitance sensor generates the touch signal in accordance with the touch action acted upon the key by the user, and the touch signal corresponds to the complete course of the key-touching action, i.e., the touch action upon the key within a moment or two. In other words, the touch signal is generated in accordance with the capacitance change as a result of the touch action at one point. The touch signal can be either analogue signals or further quantified to be digital signals with various magnitudes, wherein the touch signal is characterized with the magnitude information of the digital signal. In another example, the dynamic process can be broken down into various sub-actions, such as contacting the key, pressing the key downward, touching different areas of the key, and press different areas of the key. And the dynamic process is sensed by the sensors placed underneath the keys. In other words, the action acted upon the key by the user leads to the continuous capacitance changes of the capacitance sensors and, correspondingly, the touch signal in accordance with the capacitance changes is also continuous. The touch signal can be either analogue signals or further quantified to be various digital signals that have different continuously-changing magnitudes.

Step 102. Receiving the touch signal and generating a corresponding control signal in accordance with the magnitude information of the touch signal, by the processor.

Step 103. Actuating the light-emitting device to produce a light-emitting effect in accordance with the control signal, by the processor.

After the touch signal corresponding to the touch action of the user is generated by the capacitance sensors in accordance with the capacitance changes, the processor controls the light-emitting effect of light-emitting device corresponding to the key based on the magnitudes of the touch signal. Specifically, the processor will produce an input control signal that can be recognized by the light-emitting device to control the light-emitting effect based on the magnitude of touch signal.

In this embodiment, each key is configured to correspond to a light-emitting device that is installed underneath the key. The light-emitting device can be an LED device. The processer controls the light-emitting effect of the light-emitting device placed underneath the key in accordance with the control signal based on the magnitude of the touch signal. Specifically, the processor actuates the light-emitting device to control changes of light color and/or light brightness, or light flashing frequency, based on the magnitude of the touch signal.

Besides, the light-emitting device can also be placed away from the key area of the digital keyboard musical instrument. The number of the light-emitting devices is at least one. Therefore, the processor can also actuate multiple light-emitting devices away from the key area to control changes of light color and/or light brightness based on the touch signal mentioned above.

It should be noted that the capacitance sensor can produce analogue signals, and thus the touch signal mentioned above can be continuous analogue touch signals. As a result, for light-emitting devices that require digital control signals to control lighting, the continuous analogue touch signals need to be converted into the digital control signals, so as to control the light-emitting device.

Figure 2A:
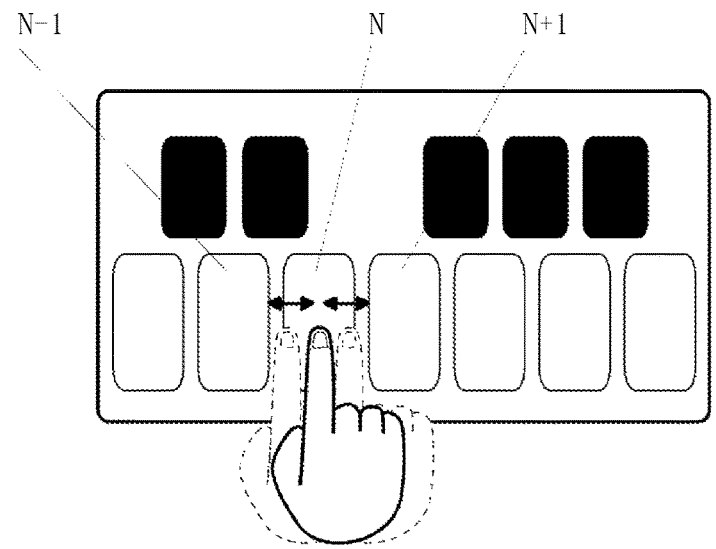
FIG. 2A is an exemplary schematic diagram illustrating a vibrato action performed on a digital keyboard musical instrument of the present invention in accordance with one embodiment of the present invention.

The following specific embodiment is used to illustrate the continuous key-touching actions. As shown in FIG. 2A is an exemplary schematic diagram illustrating a vibrato action.

In this embodiment of the present invention, the simulation of a vibrato action for a stringed instrument is achieved on the digital keyboard musical instrument by placing a finger upon the N key, and then moving the finger to the left key (N−1 key) and then the right key (N+1 key) in a rhythmic fashion and in small amplitudes without the finger leaving the N key and without fully reaching either the N−1 key or the N+1 key. The detailed finger actions can be referred to FIG. 2A.

Figure 2B:
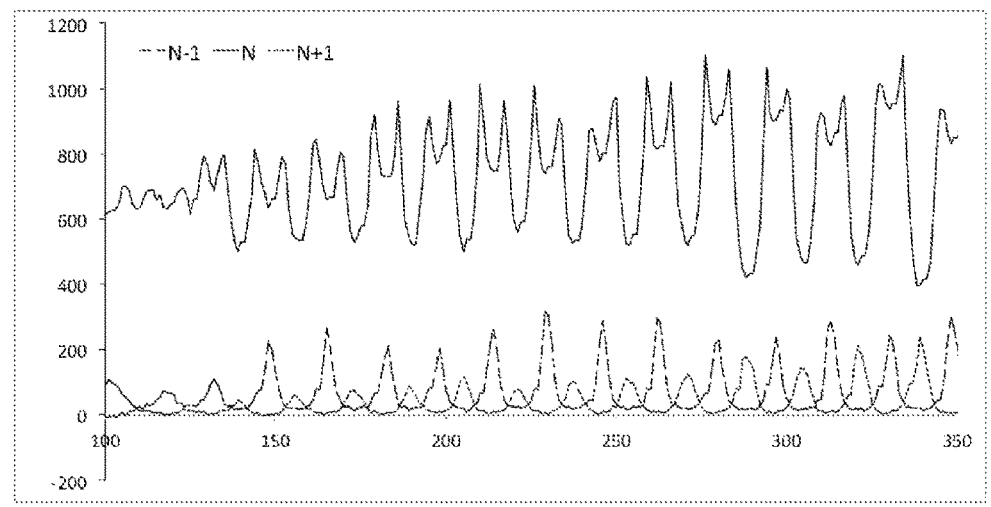
FIG. 2B is an exemplary schematic graphic illustrating the characteristic curves of the touch signals corresponding to the vibrato action illustrated in FIG. 2A, in accordance with one embodiment of the present invention.

Once a user completes the vibrato action on the N key, pressing the key left and right as mentioned above, the action is detected and captured by the capacitance sensors placed underneath the N, N−1 and N+1 keys. The capacitive sensors produce analogue continuous touch signals in accordance with the capacitance changes resulting from the vibrato action, and the characteristic curves of the touch signals are shown in FIG. 2B. In FIG. 2B, the x-axis is time and y-axis is analogue value of the capacitance signal, namely the magnitude variance of the touch signal.

It should be noted that, since the vibrato action leads to the capacitance changes of the capacitance sensors placed underneath each key, the main characteristics of the vibrato action, including pitch, volume, velocity, and dynamics of the key, can be reflected by the parameters of the output signal curves of the three relevant capacitance sensors, such as amplitude, period and frequency. For example, the main pitch is determined by the pitch associated with the sensor that has produced the largest analogue signal value (i.e., the sensor placed underneath the N key).

Figure 2C:
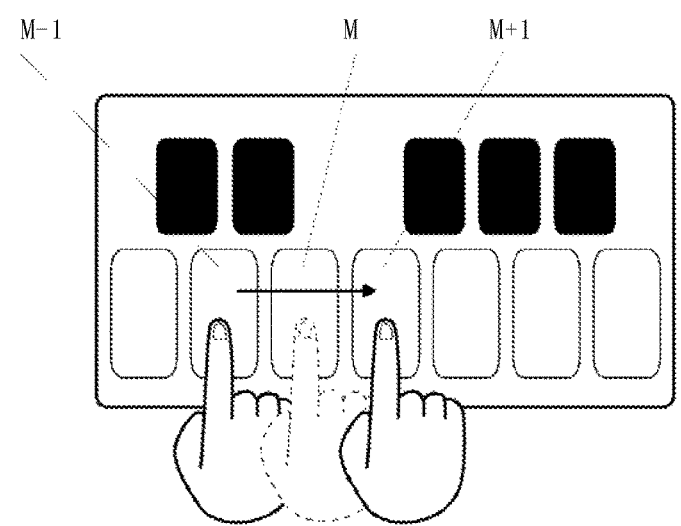
FIG. 2C is an exemplary schematic diagram illustrating a portamento action performed on a digital keyboard musical instrument of the present invention in accordance with one embodiment of the present invention.

In another embodiment of the present invention, a portamento action is shown in FIG. 2C. The simulation of the portamento action for a stringed instrument is achieved on the digital keyboard musical instrument by placing a finger upon the M−1 key, and then moving the finger to the right, passing the M key and reaching the M+1 key, in a smooth sliding motion, without the finger leaving the keyboard. The detailed finger actions can be referred to FIG. 2C.

Figure 2D:
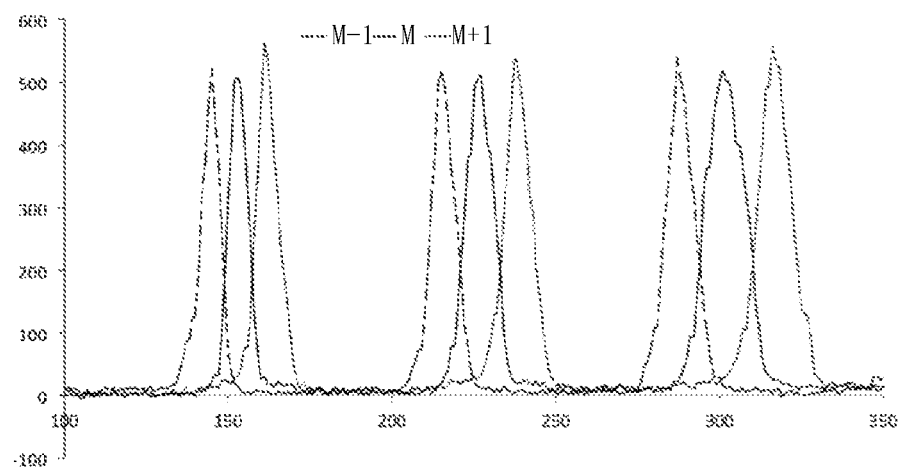
FIG. 2D is an exemplary schematic graphic illustrating the characteristic curves of the touch signals corresponding to the portamento action illustrated in FIG. 2C, in accordance with one embodiment of the present invention.

Once a user completes the portamento action on the M key, the action is detected and captured by the capacitance sensors placed underneath the M−1, M and M+1 keys successively. The capacitive sensors produce analogue continuous touch signals in accordance with the capacitance changes resulting from the portamento action, and the characteristic curves of the touch signals are shown in FIG. 2D. In FIG. 2D, the x-axis is time and y-axis is analogue value of the capacitance signal.

Subsequently, the apparatus for controlling the light-emitting device receives the continuous analogue touch signals produced by the three capacitance sensors, then converts the relevant parameters, such as amplitude, into digital signals that can be recognized by the light-emitting device, and actuates the light-emitting device to produce the light-emitting effect.

In this embodiment of the present invention, the touch action by a user upon each key of the digital keyboard musical instrument is detected by corresponding sensors placed underneath the keys, and continuous touch signals are generated in accordance with the touch action, so as to enable the processor to actuate the light-emitting device to produce the light-emitting effect in accordance with the magnitude information of the touch action. The touch action can be not only a quick action within a moment or two but also continuous touch action upon the keys. Since the detection of the touch action upon the key is accurate enough to capture all details of the complete key-touching action, which is equivalent to breaking down the dynamic process into various sub-actions, the light-emitting effect produced based on this more detailed detection of the touch action is more exquisite and accurate.

Optionally, the light-emitting effect of light-emitting device is influenced not only by the above-mentioned touch action of users, but also by other control parameters, for instance, the various music-related elements that can be predetermined in the function area of the digital keyboard musical instrument. The elements related to music include at least one of the following, pitch, tone, volume, duration, timbre, dynamics, ornament, and articulation. Thus, the control parameters of the light-emitting device can be predetermined in accordance with the preset music-related elements by the processor. The specific impact of these music-related elements on the light-emitting effect is described as follows.

Pitch: Different pitches, associated with different keys, may directly correspond to light in different colors or brightness.

Tone: Music is associated with emotions, always expressed in tonality. The tonality of music refers to music in major and minor modes. Major tonality is usually associated with bright, cheerful and positive mood. As a result, light in warm colors is always used as background for music games, so as to well express a bright and positive mood. In contrast, minor tonality usually expresses quiet, mild, meditative, slightly sad and depressing music, suitable for delicate emotions that are implicit and introverted. Therefore, the background light in cold colors could help music players feel deep empathy with music.

Volume: The volume of music can be expressed by brightness or intensity of light. For instance, the smaller the volume, the darker or the less intensive the light is.

Duration: The duration of a music sound can also be reflected brightness or intensity of light.

Timbre: Different musical instruments produce different sound. Thus, different timbres can be associated with light in different colors, for example, bright yellow for piano, light blue for violin, violet for cello, and so on.

Dynamics: The correlation of lighting with dynamics is similar to that with volume.

Ornaments: In music, ornaments are musical flourishes that are not necessary to carry the overall line of the melody, but serve instead to decorate that line to make the melody more colorful and characteristic. Commonly used ornaments include appoggiatura, vibrato, gruppetto, mordent, and glissando. Lighting corresponding to ornaments can also produce ornamental effects.

Articulation: In music, articulation refers to the musical performance technique that affects the transition or continuity on a single note, or between multiple notes or sounds, for example, staccato, legato, marcato, and tenuto. Lighting variances corresponding to articulation can produce special effects.

Thus, prior to step 103 described above, the processor can also retrieve a preset control parameter that is predetermined in relation with an element related to music. Correspondingly, in step 103, the processor actuates the light-emitting device to produce a light-emitting effect in accordance with both the control signal and the preset control parameter, i.e., controlling the color and/or brightness, as well as changes in color and/or brightness of the light.

In this embodiment of the present invention, with the settings of the predetermined control parameters, the light-emitting effect is also set basically. And more detailed and differentiating control of the light-emitting effect in accordance with the touch signals corresponding to the touch action could be further achieved by more accurate and detailed detection of the touch action.

Figure 3:
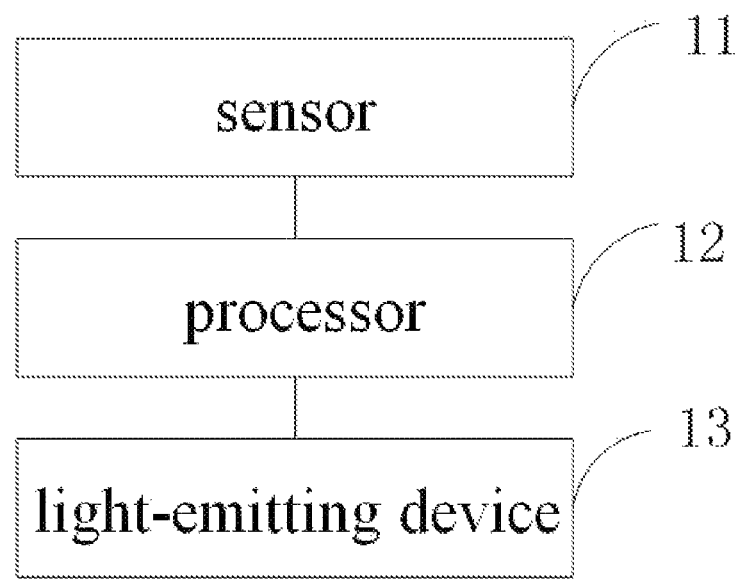
FIG. 3 is an exemplary schematic diagram of an apparatus for controlling a light-emitting device of a digital keyboard musical instrument, in accordance with one embodiment of the present invention.

FIG. 3 is an exemplary schematic diagram of an apparatus for controlling a light-emitting device of a digital keyboard musical instrument, in accordance with one embodiment of the present invention. As shown in FIG. 3, the light-emitting device includes sensor 11, processor 12 and light-emitting device 13. Each sensor 11 corresponds to a key in the key area of the digital keyboard musical instrument and is placed underneath its corresponding key.

The sensor 11 is used to detect a touch action by a user upon the key of the digital keyboard musical instrument, and generate a corresponding touch signal that includes the magnitude information of the touch action, and transmit the touch signal to the processor 12.

The processor is configured to receive the touch signal and generate a corresponding control signal in accordance with the magnitude information of the touch signal. The processor 12 is also configured to actuate the light-emitting device to produce a light-emitting effect in accordance with the control signal.

Specifically, the touch signal is the continuous touch signal corresponding to the touch action. Correspondingly, the control signal is generated by the processor 12 in accordance with the magnitude of the continuous touch signal.

Specifically, the sensor 11 can be a capacitance sensor or a pressure sensor.

Further, the processor 12 is also used to retrieve a preset control parameter that is predetermined in relation with an element related to music. Correspondingly, the processor 12 actuates the light-emitting device to produce the light-emitting effect in accordance with the control signal and the preset control parameter.

Further, the light-emitting device 13 is placed underneath the key or outside the key area of the digital keyboard musical instrument. And the processor 12 is configured to control the color and/or brightness, as well as changes in color and/or brightness of the light in accordance with the control signal and the preset control parameter.

It is obvious that the light-emitting devices described in this embodiment can be used to implement the technical method illustrated in FIG. 1, and thus no further details are repeated here.

People skilled in the art shall clearly understand that all or part of the above embodiments can be implemented by relevant hardware, as directed by programs. And the programs can be stored in a computer-readable storage medium. The storage medium includes all kinds of medium that can store programming code, such as ROM, RAM, CD, and so on.

The invention claimed is:

1. A method for controlling a light-emitting device of a digital keyboard musical instrument, comprising:
    detecting a touch action generated by a user upon a key of the digital keyboard musical instrument and generating a continuous touch signal that corresponds to the process of the touch action, by a capacitance sensor placed underneath the key, and transmitting the continuous touch signal to a processor, wherein the continuous touch signal comprises the magnitude information of the touch action;
    receiving the continuous touch signal and generating a corresponding control signal in accordance with the magnitude information of the continuous touch signal, by the processor;
    actuating the light-emitting device to produce a light-emitting effect in accordance with the control signal, by the processor.

2. The method of claim 1, before the processor actuates the light-emitting effect of the light-emitting device in accordance with the control signal, further comprising:
    retrieving a preset control parameter by the processor, wherein the preset control parameter is predetermined in relation with an element related to music.

3. The method of claim 2, further comprising, actuating the light-emitting device to produce a light-emitting effect in accordance with the control signal and the preset control parameter by the processor.

4. The method of claim 2, wherein the element related to music is selected from a group consisting of pitch, tone, volume, duration, timbre, dynamics, ornaments, and articulation.

5. The method of claim 1, wherein the light-emitting device is placed underneath the key or away from the key.

6. The method of claim 1, wherein the light-emitting effect is selected from a group consisting of color, brightness, change in color, and change in brightness.

7. An apparatus for controlling a light-emitting device of a digital keyboard musical instrument, comprising:
    a capacitance sensor, a processor and a light-emitting device;
    wherein the capacitance sensor corresponds to a key of the digital keyboard musical instrument and is placed underneath the corresponding key;
    wherein the capacitance sensor is configured to detect a touch action generated by a user upon the key of the digital keyboard musical instrument and generate a continuous touch signal that corresponds to the process of the touch action, and transmit the continuous touch signal to the processor, wherein the continuous touch signal comprises the magnitude information of the touch action;
    wherein the processor is configured to receive the continuous touch signal and generate a corresponding control signal in accordance with the magnitude information of the continuous touch signal;
    wherein the processor is configured to actuate the light-emitting device to produce a light-emitting effect in accordance with the control signal.

8. The apparatus of claim 7, before the processor actuates the light-emitting effect of the light-emitting device in accordance with the control signal, wherein the processor is configured to retrieve a preset control parameter, and wherein the preset control parameter is predetermined in relation with an element related to music.

9. The apparatus of claim 8, wherein the processor is configured to actuate the light-emitting device to produce a light-emitting effect in accordance with the control signal and the preset control parameter.

10. The apparatus of claim 8, wherein the element related to music is selected from a group consisting of pitch, tone, volume, duration, timbre, dynamics, ornaments, and articulation.

11. The apparatus of claim 7, wherein the light-emitting device is placed underneath the key or away from the key.

12. The apparatus of claim 7, wherein the light-emitting effect is selected from a group consisting of color, brightness, change in color, and change in brightness.

* * * * *